(12) United States Patent
Arditi et al.

(10) Patent No.: US 7,398,396 B2
(45) Date of Patent: Jul. 8, 2008

(54) ELECTRONIC SIGNATURE METHOD, PROGRAM AND SERVER FOR IMPLEMENTING THE METHOD

(75) Inventors: David Arditi, Clamart (FR); Laurent Frisch, Paris (FR); Dimitri Mouton, Paris (FR)

(73) Assignee: France Telecom, Paris (FR)

( * ) Notice: Subject to any disclaimer, the term of this patent is extended or adjusted under 35 U.S.C. 154(b) by 835 days.

(21) Appl. No.: 10/659,796

(22) Filed: Sep. 11, 2003

(65) Prior Publication Data

US 2004/0093499 A1 May 13, 2004

(30) Foreign Application Priority Data

Sep. 18, 2002 (FR) .................................. 02 11548

(51) Int. Cl.
*H04L 9/00* (2006.01)
(52) U.S. Cl. ...................... 713/176; 713/155; 713/156; 713/157; 713/173; 713/175
(58) Field of Classification Search ................. 713/176, 713/153, 155–157
See application file for complete search history.

(56) References Cited

U.S. PATENT DOCUMENTS

| | | | | |
|---|---|---|---|---|
| 6,424,718 | B1 * | 7/2002 | Holloway | 380/277 |
| 6,871,276 | B1 * | 3/2005 | Simon | 713/156 |
| 6,970,562 | B2 * | 11/2005 | Sandhu et al. | 380/30 |
| 2004/0103316 | A1 * | 5/2004 | Gehrmann | 713/201 |
| 2004/0117726 | A1 * | 6/2004 | Inada et al. | 715/500 |

OTHER PUBLICATIONS

Adams et al., "Internet X.509 Public Key Infrastructure Time-Stamp Protocol (TSP)," Network Working Group, Request for Comments: 3161 (Aug. 2001).
Fielding et al., "Hypertext Transfer Protocol—HTTP/1.1," Network Working Group, Request for Comments: 2616 (Jun. 1999).
Housley, "Cryptographic Message Syntax," Network Working Group, Request for Comments: 2630, IETF (Jun. 1999).
Housley et al., "Internet X.509 Public Key Infrastructure Certificate and Certificate Revocation List (CRL) Profile," Network Working Group, Request for Comments: 3280 (Apr. 2002).

(Continued)

*Primary Examiner*—Nasser Moazzami
*Assistant Examiner*—Fikremariam Yalew
(74) *Attorney, Agent, or Firm*—Drinker Biddle & Reath LLP

(57) ABSTRACT

In order to apply an electronic signature from a client station having authentication resources at a server, the following steps are carried out: the client station is authenticated at the server, thus establishing an authenticated communication channel; a private key/public key pair is generated at the client station; a signature certificate request generated by means of at least the public key is transmitted from the client station to the server via the authenticated channel; a signature certificate obtained in response to the request is returned via the authenticated channel; this certificate is verified at the client station; an electronic signature is calculated at the client station by means of the private key, after which this private key is destroyed; and the calculated signature is formatted with the aid of the signature certificate received via the authenticated channel.

14 Claims, 2 Drawing Sheets

OTHER PUBLICATIONS

Kaliski, "PKCS #7: Cryptographic Message Syntax Version 1.5," Network Working Group, Request for Comments: 2315, RSA Security & IETF (Mar. 1998).

Menezes et al., "Handbook of Applied Cryptography," CRC Press Series on Discrete Mathematics and Its Applications, Boca Raton, Florida, CRC Press, pp. 548-549, 559-560 (1997).

Myers et al., "X.509 Internet Public Key Infrastructure Online Certificate Status Protocol—OCSP," Network Working Group, Request for Comments: 2560, IETF (Jun. 1999).

Search Report established for FR 0211548.

* cited by examiner

ELECTRONIC SIGNATURE METHOD, PROGRAM AND SERVER FOR IMPLEMENTING THE METHOD

BACKGROUND OF THE INVENTION

The present invention relates to public key cryptography techniques. It relates more particularly to methods of certifying cryptographic keys.

The fundamental object used to provide confidence in the public part of a cryptographic key (public key) is the certificate. The certificate standard used in numerous networks including the Internet is X.509, version 3. A specification of this is provided by the PKIX working group of the IETF ("Internet Engineering Task Force") in Request for Comments (RFC) 3280, "Internet X.509. Public Key Infrastructure; Certificate and Certificate Revocation List (CRL) Profile", published in April 2002. The certificate is an object which comprises, in particular:

the public key to be certified;
the identity of its holder;
a period of validity;
a cryptographic signature of these data by the private key of a Certification Authority (abbreviated to CA) issuing the certificate.

Having confidence in the public key associated with an identity is equivalent to being certain of the validity of the certificate. For PKIX, a certificate is valid at a given instant T (in terms of confidence):

either if it is expressly declared to be a "certificate of confidence". In practice, users' certificates are never declared to be certificates of confidence. Instead, a smaller number of certificates of confidence is declared, consisting of the certificates of certain CAs;
or if the following conditions are fulfilled:
the cryptographic signature of the certificate is mathematically valid;
the instant T forms part of the period of validity of the certificate;
the certificate is not revoked at the instant T;
the public key of the issuing CA is available via a certificate of the CA, and this certificate of the CA is itself valid at the instant T.

A certificate is revoked at an instant TR of its period of validity if, from this instant onwards, the CA which has issued it has doubts as to whether the private key associated with the certificate has been compromised. The purpose is to invalidate the certificate from TR onwards. In practice, this is the case when the user of the certificate loses his private key associated with the certified public key or has had it stolen, when the CA no longer wishes to certify the user's key (for example when an employee leaves a business), or in other cases.

According to PKIX, a revoked certificate must be entered in a revocation list (CRL, "Certificate Revocation List") which is a list of certificates issued by a CA and revoked by it. In theory, a CA must never remove a certificate from a CRL. For example, if a signature is issued at an instant T with a certificate revoked at T, it must always be possible to establish that the certificate was actually revoked at T and therefore that the signature is invalid.

At present, there are two means of establishing that a given certificate has not been revoked:

accessing the CRL. The verifier of the certificate downloads the CRL from a server, verifies the signature of the CRL and then searches for the certificate to be verified in the CRL;

on-line checking of non-revocation. So that the verifier can avoid downloading CRLs which may be very large, an on-line protocol has been specified for checking only one or a few certificates. This is the OCSP protocol described in RFC 2560, "Internet X.509 Public Key Infrastructure; Online Certificate Status Protocol—OCSP", published in June 1999 by the IETF. According to this protocol, the verifier of the certificate sends an OCSP request to an OCSP server subordinate to the issuing CA, receives the signed OCSP response from this server, verifies the signature of the OCSP response and analyses this response.

The OCSP is used on-line. The CRLs are used either on-line or off-line, but with regular updating of the CRLs.

In a public key infrastructure, when a certificate expires, the Certification Authority uses a renewal mechanism to deliver a new certificate to the user without having to repeat the registration phase, which consists in the collection and verification of the data relating to the user.

Certificates in the X.509 format are produced for purposes expressed explicitly, called "key usage" (for example, electronic signature, encryption, authentication, time-stamping, SSL server, etc.). A certificate can have a composite key usage. However, in order to limit the risks if a certificate becomes compromised, it is prudent and common practice to assign only a restricted number of these key usages to a single certificate. Thus a user can, in certain cases, have a plurality of certificates, each corresponding to a different use. The problem is then, on the one hand, the user's difficulties in handling these certificates, and, on the other hand, the high management cost for the certification authority. It is therefore useful to be able to distribute these certificates with a restricted key usage, which is as small as possible for each user, without restricting the applications which this makes available to the user.

Public key cryptographic mechanisms can be used to provide a plurality of services having different characteristics, which justify different treatments of the certificates used for the provision of each of the services.

Examples of these services are:

Confidentiality (encryption): encrypted data must be recoverable if the private key is lost, otherwise they may be irretrievably lost. Encryption keys are therefore sequestered and recoverable.

Electronic signature: the signature key must exist in the form of a single copy, held by the certificate holder, in order to ensure that no-one else has been able to sign in his name. Since the key cannot be duplicated, it cannot be sequestered, and must be different from the encryption key. Signatures must be verifiable beyond the period of validity of the certificate, and therefore the certificate must be retained in order to permit these verifications.

Authentication: the authentication key must also be unique, and therefore different from the encryption key. But the possibility of inducing a user to apply an electronic signature by making him believe that he is simply providing an authentication must be prevented. This could be achieved by replacing the challenge used in a challenge/response public key authentication system. There is a risk that such a message could be signed by the user without his knowledge. The authentication key must therefore be distinguished from the signature key. Furthermore, the authentication certificate does not generally have to be kept beyond its lifetime, since it is only used in unique, instantaneous, and non-persistent verification operations.

It is therefore frequently necessary to provide specialized certificates, and a user wishing to use a plurality of the above services has to have the same number of certificates. Encryption certificates have a lifetime determined in the Certification Policy of the Certification Authority that issues them. This lifetime is typically from one to three years for users' certificates.

Since this is a long time, it is necessary to allow for the possibility that the certified key may be compromised during the period of validity of the certificate. A revocation and revocation check mechanism is therefore established for invalidating a certificate which must no longer be used. On the other hand, the fact that an electronic signature has been applied with a certificate having a relatively long lifetime gives little information as to the date on which the signature was applied. The electronic signature mechanism must therefore be linked to a time-stamping mechanism.

The electronic signature function makes it possible to guarantee the authenticity of a document, in other words to reliably authenticate its signatory or signatories and to guarantee that the document has not been modified (integrity). The electronic signature is frequently used to guarantee non-repudiation. The non-repudiation of a document is a matter of providing a defence against subsequent denial by its originator.

The most commonly used formats for signed messages are:

PKCS#7, published by RSA Security, Inc., and by the IETF in March 1998 (RFC 2315, "PKCS#7: Cryptographic Message Syntax; Version 1.5"), which has also been adopted in CMS ("Cryptographic Message. Syntax", RFC 2630, IETF, June 1999). These standards are used, in particular, in the S/MIME ("Secure Multipurpose. Internet Mail Extensions") specification for signed electronic mail. They are based on certificates issued by PKIX (X.509, CRL, OCSP) and are "extendable", in the sense that it is possible to add extensions (supplementary information) which can be signed (authenticated/Attributes) or unsigned (unauthenticated/Attributes).

XML-DSig, belonging to the XML ("extended Markup Language") family of data formats. This format enables certificates issued by PKIX to be used, and is also extendable.

PGP, corresponding to the signed messages produced by the PGP ("Pretty Good Privacy") software marketed by Networks Associates Technology, Inc. and similar products. These certificates are different from those issued by PKIX.

Clearly, with these electronic signature formats the signature certificate has to have a key usage which permits the signature. However, the key usage in question is not always the same, varying with the tools used. For example, the Netscape Mail messaging software produced by Netscape Communications Corporation and Outlook Express produced by Microsoft Corporation require different key usages. Furthermore, signing is not permitted if the certificate does not have one of these key usages.

There are services which enable a user to apply an electronic signature without himself having cryptographic equipment. Services of this kind can operate in various ways:

1/ The user is registered at a server which stores, in encrypted form, a locked signature key and a certificate in his name. When the user wishes to apply a signature, he sends the data to be signed to the server, together with a password for decrypting and unlocking his signature key. The server uses this password and these data to apply the signature, and returns the result to the user. A drawback of this mode of operation is that the user does not control his means of signature. Since the signatures are not applied at his station, he cannot be certain that the server will not apply other signatures without his knowledge.

2/ The user is registered at a server which stores, in encrypted form, a signature key and a certificate in his name. When the user wishes to apply a signature, he authenticates himself at the server, and the server sends him his encrypted signature key. The user decrypts his key by means of a password known only to him, uses this key to apply his signature, and then deletes the key from his station. A drawback of this mode of operation is the presence of signature keys in a database on the server. A malicious individual having access to the key database could attempt to attack these keys in order to decrypt them, and consequently use them for applying signatures without the knowledge of the keyholder.

When an electronic signature is used to guard against repudiation, it is desirable for the signature to remain valid for a certain period. In general, the period of validity required for the signature (of the order of ten years at the present time) is considerably longer than the period of validity of a certificate (one year at the present time). Furthermore, it is generally desirable to have not only a signature but also the date (and possibly the time) of the signature.

There are several well-known methods for locating a signature in time (time-stamping) and for extending the period of validity of a signature beyond that of the signatory's certificate:

Non-consensual time-stamping: the signatory himself places the time-stamping data element in his document and signs this data element as an integral part of the document. This guarantees only the agreement of the signatory himself as to the time, and does not enable the validity of the signature to be extended. In another embodiment, the non-consensual time-stamping is applied by a server and kept with the signature.

Consensual time-stamping: the signatory and the addressee of the signed document agree on a time-stamp, which the signatory places in his document and which he signs at the same time. A variant consists in having the time-stamp initially signed by the addressee, and placing this signed time-stamp in the document. In both cases, the signature can be considered to be correctly located in time because of the degree of protection provided by the protocol. Again, however, the validity of the signature cannot be extended.

Secure time-stamping: when the document has been signed, the signatory makes use of a "time-stamping third party". This is a reliable third party holding a key and a certificate with a long life, in other words one whose life covers the period of validity of the signature. The time-stamping third party sends him a time-stamping token which comprises the time-stamp and a unique reference to the signed document, the token itself being signed by the time-stamping third party with his long-life key. This token guarantees the instant of time-stamping of the document in a cryptographically secure way. This makes it possible, on the one hand, to determine the time of signature from the time of the token, and, on the other hand, to extend the validity of the signature by extending it to the period of validity of the time-stamping token. There is, in particular, an IETF standard on time-stamping, namely the TSP (RFC 3161, "Internet X.509 Public Key Infrastructure; Time-Stamp Protocol", August 2001).

A number of methods can be used to authenticate a user at a server:

- The static password. This is a character string sent by the user to the server. The server can also know this password and compare the transmitted value directly with the known value. Otherwise, it can know the result of an operation performed on this password, and initially perform this operation on the transmitted value before making the comparison.
- The questionnaire. A number of questions are put to the user, who is considered to be the only party who knows the answers, and who has previously answered the same questions to record the answers. The questions are generally of the following type: mother's maiden name, football team supported, favorite cartoon character, dog's name, etc.
- The calculated password. The user has a device which performs a calculation, different on each occasion, on the basis of a secret key shared between the device and the server and a pseudo-random element such as the time. The server performs the same calculation and compares the results. If the values are identical, the user must be in possession of the device, and is therefore who he claims to be.
- The non-reusable password. The user has a certain number of one-time codes, in the form of scratch cards for example, which are referenced at the server. If the code submitted for authentication is one of those that the user is considered to hold, the authentication is successful.
- Challenge/response with secret key. The user shares a secret key with the server. The server sends a random number to the user (the "challenge"). The user performs a calculation on the challenge with the aid of the secret key and sends back the result of the calculation (the "response"). The server performs the same calculation and compares its result with the response sent by the user. If there is a match, the user is authenticated.
- Challenge/response with public key. The user has a private key of which he is the sole holder. The server knows the public key corresponding to this private key, in the form of a certificate for example. The server sends a random challenge to the user, who performs a calculation on this challenge with the aid of his private key. The resulting response is sent to the server, which applies the reverse calculation to it with the aid of the public key. If this results in the original challenge sent, the user is authenticated.

It should be noted that the availability of an authentication resource is not generally sufficient for the electronic signature of a document. In order to apply an electronic signature, a user must be the only party in possession of a secret, whereas in most authentication mechanisms (except the public key challenge/response system) the secret has to be shared in order to be verifiable by the server.

An object of the present invention is to propose a simple and efficient method enabling a user having authentication resources to apply an electronic signature.

SUMMARY OF THE INVENTION

The invention thus proposes a method for applying an electronic signature from a client station, comprising the steps of:

/A/ authenticating the client station at a server, thus establishing an authenticated communication channel between the client station and said server, /B/ generating a private key/public key pair at the client station;

/C/ sending from the client station to the server, via the authenticated channel, a request for a signature certificate, generated by means of at least the public key;

/D/ sending from the server to the client station, via the authenticated channel, a signature certificate provided in response to said request;

/E/ calculating a cryptographic signature at the client station by means of the private key, then destroying the private key at the client station; and /F/ formatting the calculated signature with the aid of the signature certificate received by the client station via the authenticated channel.

Usually, the authentication of the client station is considered, according to the context in which the method is used, to be an authentication of the hardware and/or software platform of the station or an authentication of a subscriber or a user of the station.

There is generally a preliminary step consisting of a registration of the client station (or its user) with respect to a CA with which the server interacts, or with respect to a Registration Authority associated with this CA. This preliminary step provides the necessary data for creating a signature certificate for the station.

The signature certificate obtained by the server preferably has a relatively short lifetime, typically not more than one day.

The method enables a user who only has authentication resources to apply an electronic signature, while requiring only simple management of the keys and certificates. Even though a time-stamp (consensual or non-consensual, secure or otherwise) can be added to the signature provided in this way, the lifetime of the certificate is in itself enough to locate the signature in time.

In a preferred embodiment, the steps /C/ and /E/ are executed in parallel at the client station. This is because it is not necessary for the client to wait for the certificate before applying the cryptographic signature, and afterwards he no longer needs the private key.

The method is well suited to environments allowing applications to be exchanged between the server and the clients, by means of mobile code languages, the most commonly used of which is the Java language devised by Sun Microsystems, Inc. In this case, one advantageous possibility is that steps /B/, /C/, /E/ and /F/ can be at least partially executed at the client station under the control of a program downloaded by the server in response to step /A/.

In this context, another object of the invention is to provide an electronic signature assistance server, comprising means of authenticating a client station to establish an authenticated communication channel with the latter, means for obtaining a signature certificate in response to a request received from the client station via the authenticated channel and for transmitting said certificate to the client station via the authenticated channel, and means for downloading to the client station a program written in a mobile code language, including instructions for controlling, at least partially, the execution of the following operations by the client station:

generation of a private key/public key pair at the client station after the establishment of the authenticated channel;

transmission to the server, via the authenticated channel, of a request for a signature certificate generated by means of at least the public key;

reception, via the authenticated channel, of the signature certificate transmitted by the server in response to said request;

calculation of a cryptographic signature at the client station by means of the private key, followed by destruction of the private key; and formatting of the calculated signature with the aid of the signature certificate received via the authenticated channel.

Another aspect of the present invention relates to a computer program product, comprising instructions to be executed in a client station having authentication resources with respect to an electronic signature assistance server, said instructions including:

instructions for generating a private key/public key pair after the establishment of an authenticated channel between the client station and said server;

instructions for transmitting to the server, via the authenticated channel, a request for a signature certificate generated by means of at least the public key;

instructions for receiving from the server, via the authenticated channel, a signature certificate obtained in response to said request;

instructions for calculating a cryptographic signature by means of the private key, and then for destroying the private key; and instructions for formatting the calculated signature with the aid of the signature certificate received via the authenticated channel.

Such program product can be downloaded from an assistance server as indicated above. It can also consist, wholly or partially, of a resident program of the platform constituting the client station.

BRIEF DESCRIPTION THE DRAWINGS

DESCRIPTION OF PREFERRED EMBODIMENTS

Figure 1:
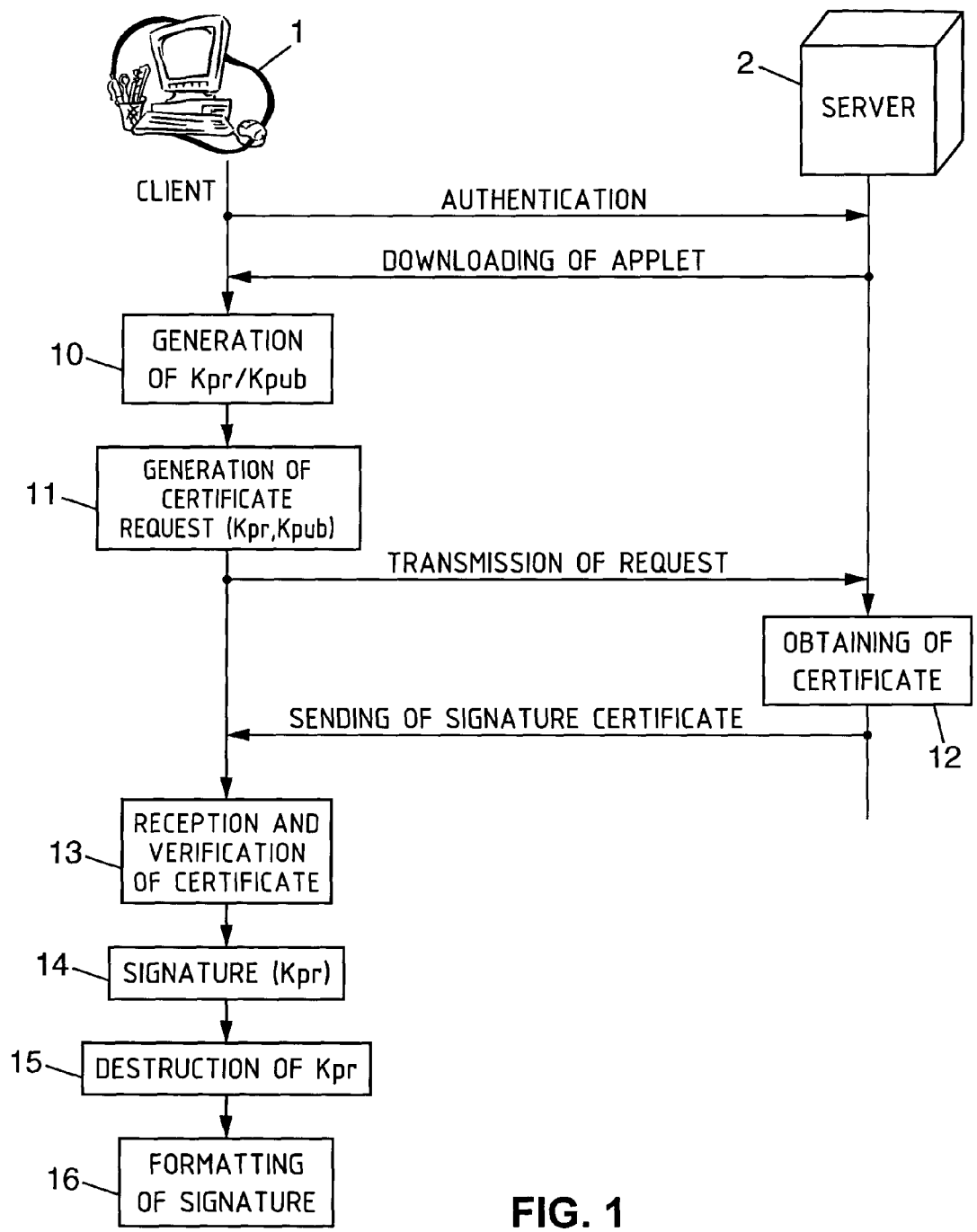
FIG. 1 is a diagram illustrating an implementation of the method according to the invention.

FIG. 1 shows a client station 1 which has authentication resources but which does not have electronic signature resources (keys). However, the method illustrated in the figure enables the client to sign a document electronically. For this purpose, the client station 1 enters into a relationship with an electronic signature assistance server 2.

The server 2 can relay the certificate signing requests (CSR) which it receives to a certification authority (CA) which has confidence in the server and therefore signs them. The server can, in particular, be identical with the CA. Otherwise it can connect with mutual authentication to a CA, for example by means of version 3 of the SSL ("Secure Sockets Layer") protocol produced by Netscape Communications Corporation. The communication between the CA and the server 2 can be encrypted if necessary.

In a preliminary step, the user of the client station is registered at the CA, which formally verifies his identity in accordance with its Certification Policy, and thus possesses all the necessary data for the creation of a signature certificate. This registration can also be carried out at a Registration Authority interacting with the CA.

By way of example and without restrictive intent, the client station 1 can use, as is commonly done, a Web browser software capable of executing programs written in a mobile code language such as Java. Examples of such browsers include Internet Explorer, produced by Microsoft Corporation, and Netscape Navigator, produced by Netscape Communications Corporation.

This client station has, for example, an authentication certificate of the SSL type. In this case, the server 2 is provided with conventional functionality enabling it to establish a secure SSLv3 session with the client station 1 after authenticating the latter. All the messages illustrated in FIG. 1 are exchanged in this SSLv3 session between the client station 1 and the server 2.

The first step of the method of FIG. 1 thus consists of the authentication of the user of the client station 1 at the server 2, and the creation of the authenticated channel, which in this example corresponds to the SSLv3 session which is established. In the case described, in which the client-server exchanges are carried out in an SSLv3 session, a mutual authentication of the server and the client station is preferably carried out. However, it would be possible simply to authenticate the client 1 or to use a protocol other than SSL.

The server 2 then downloads, via this authenticated channel, a program written in the mobile code language (an "applet" in the Java jargon), comprising instructions for executing at the client station 1 the operations illustrated on the left-hand side of the figure.

The first of these operations (step 10) is the generation of a private key (Kpr)/public key (Kpub) pair to enable signature according to a known method of asymmetric cryptography, such as RSA ("Rivest, Shamir, Adelman"), DSA ("Digital Signature Algorithm"), EC-DSA ("Elliptic Curve DSA"), or the like.

The applet then generates a signature certificate request at the client station 1 (step 11). This request is generated from at least the public key KpUb obtained in step 10. It will frequently be generated from the pair Kpr/Kpub. The request is transmitted to the server 2 in the SSLv3 session.

The certification request (CSR) transmitted by the client can be in any acceptable format, whether standardized or proprietary. Among the standardized formats used at present, the following non-exhaustive list can be mentioned: SPKAC, PKCS#10, CRS. The certification request may or may not contain the proof of possession of the public key, may or may not contain information on the user, and may contain any other information suitable for inclusion and described in the Security Policy of the service.

The server 2 then proceeds (step 12) to obtain for the client station 1 a short-life signature certificate, enabling the public key Kpub to be certified. The certificate is generated locally when the server is identical with the CA. Otherwise, the CSR is relayed to the CA and the server 2 obtains the certificate from the latter.

The certificate obtained in step 12 is advantageously a X.509 certificate having a short life (for example one day or one hour), and has a key usage permitting signature and depending on the application in which the signature is to be applied. It is transmitted to the client station 1 in the SSLv3 session.

The client station 1 receives this signature certificate in step 13, and extracts therefrom the parameters required by the applet for formatting the electronic signatures.

The applet executes the cryptographic signature of the document in step 14 by means of the private key Kpr generated in step 10, after which it orders the destruction of this private key Kpr in step 15.

When the signature has been applied and the certificate has been recovered, the applet formats the electronic signature in step 16, for example by putting it into the PKCS#7 format, including the certificate in the PKCS#7 envelope. The signed document can then be stored or transmitted to third parties (not shown). Regardless of the cryptographic signature calculated in step 14, the electronic signature (after formatting) can have any signature format such as: PKCS#7/CMS, XML-Dsig, PGP, etc.

Figure 2:
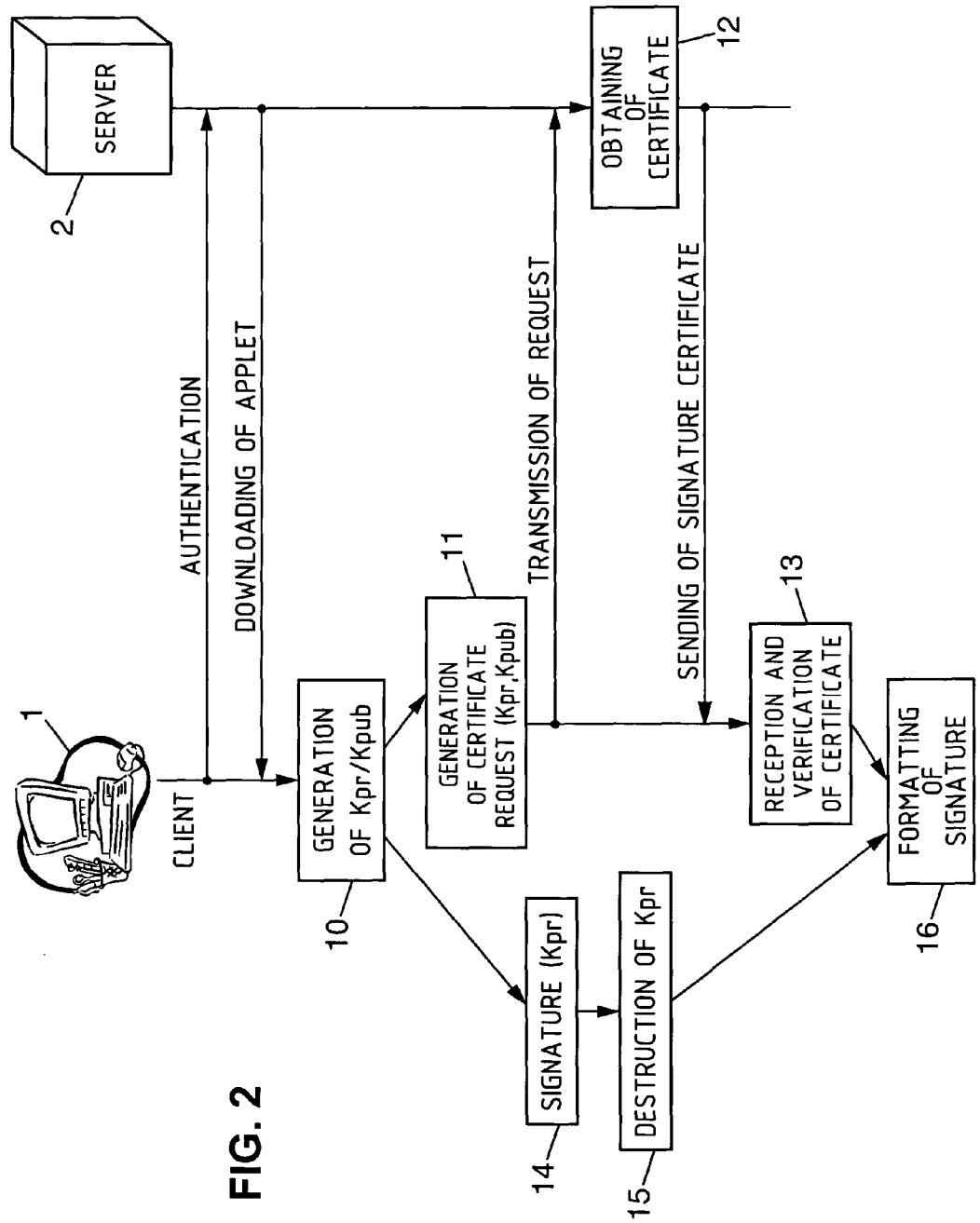
FIG. 2 is a diagram illustrating an alternative embodiment of the method according to the invention.

In the preferred embodiment shown in FIG. 2, the client station 1 executes steps 11 and 13, on the one hand, and steps 14 and 15, on the other hand, in parallel.

The invention is not limited to the embodiments described above.

In particular, the authentication of the user of the client station 1 by the server 2 can be carried out by any means of authentication providing the desired security level, in accordance with the Security Policy drawn up by the CA for the electronic signature service. Examples of possible modes of authentication are:

The static password, used in the context of a proprietary or standardized protocol, regardless of the size of the password or other constraints imposed on it.

The questionnaire, used in the context of a proprietary or standardized protocol, regardless of the number of questions, the form of these questions, their language or their nature (words, phrases, drawings, etc.).

The calculated password, used in the context of a proprietary or standardized protocol, regardless of the size of this password and its method of calculation.

The non-reusable password, used in the context of a proprietary or standardized protocol, regardless of the physical medium of the password, its form, its nature, or its size.

Challenge/response with secret key, used in the context of a proprietary or standardized protocol, regardless of the medium of the secret key, the method and algorithm for calculating the response, or the nature, form or size of the challenge and the response.

Challenge/response with public key, used in the context of a proprietary or standardized protocol, regardless of the nature, size and medium of the private key, the method and algorithm for calculating the response, the nature, form or size of the challenge and the response, or the nature of the certificate and/or the public key.

The method according to the invention can be used in all types of environment, for example:

In a browser in a web service, in the form of an applet as described above, but also in the form of a script, a call to a "plug-in" component, to an external program, to an "ActiveX" component, to a dynamic library, etc.

In the context of a messaging client, for example in the form of a call to a "plug-in" component, to an external program, to a dynamic library, etc.

In the context of an independent application, as part of a wider service such as a secure archiving service, a secure document publication service, a data flow management service ("workflow", "dataflow"), etc.

As a stand-alone service.

The client may not wish to authenticate the server. In this case he simply has to verify the validity of the delivered certificate when he has received it. If the client does authenticate the server, he can either have confidence in the validity of the certificate because it has been delivered by a trusted server, or verify the validity of this certificate by the conventional methods of verifying sequences of trusted certificates.

The protocol used between the client 1 and the authentication server 2 can be a standardized protocol or a proprietary protocol. This protocol can be security protected or not. An example of a non-security-protected protocol which can be used is HTTP ("HyperText Transfer Protocol", RFC 2616, June 1999, IETF). Among the security protected protocols which can be used, we may mention SSH, produced by SSH Communications Security, or HTTPS (HTTP on SSLv2 or SSLv3).

A reliable time-stamp can be added to the signature before or after the certification request. This time-stamp can be supplied by the same server as the rest of the service or by a separate server. In particular, it can be obtained from a time-stamping server, directly or through the intermediary of the authentication server. This time-stamp can be in any technically correct format accepted in the context of the Security Policy of the service in the context of which the method is used.

In the particular case described above, an applet is responsible for generating the signature keys (step 10) and then applying the cryptographic signature and the formatting (steps 14 and 16). For the key generation function itself, there are also alternatives:

the applet can call a functionality already present in the client station to generate the key;

the key can be generated before the start of execution of the applet, by the framework program (for example the browser or the messaging tool).

It is also possible for the applet to call a functionality already present in the station to execute the cryptographic signature and/or to format it.

The invention claimed is:

1. A method for applying an electronic signature from a client station, comprising the steps of: /A/ authenticating the client station at a server, thereby establishing an authenticated communication channel between the client station and said server; /B/ generating a private key/public key pair at the client station; /C/ sending from the client station to the server, via the authenticated channel, a request for a signature certificate, generated by means of at least the public key, said request providing to the server information pertaining to at least the public key and excluding the private key; /D/ sending from the server to the client station, via the authenticated channel, a signature certificate provided in response to said request; /E/ calculating a cryptographic signature at the client station by means of the private key, then destroying the private key at the client station; and /F/ formatting the calculated signature with the aid of the signature certificate received by the client station via the authenticated channel.

2. Method according to claim 1, wherein steps /C/ and /E/ are executed in parallel at the client station.

3. Method according to claim 1, wherein steps /B/, /C/, /E/ and /F/ are at least partially executed at the client station under the control of a program downloaded from the server in response to step /A/.

4. Method according to claim 1, wherein step /A/ comprises mutually authenticating the server and the client station.

5. Method according to claim 1, comprising the further step of verifying, at the client station, the signature certificate received via the authenticated channel.

6. Method according to claim 1, wherein the signature certificate obtained by the server has a validity period of at most one day.

7. Method according to claim 1, comprising the preliminary step of registering the client station with respect to a certification authority with which the server cooperates, or with respect to a registration authority associated with said certification authority.

8. A computer program product on a recordable medium, comprising instructions for controlling a client station having authentication resources with respect to an electronic signature assistance server, said instructions including: instructions for generating a private key/public key pair after the establishment of an authenticated channel between the client station and said server; instructions for transmitting to the server, via the authenticated channel, a request for a signature certificate generated by means of at least the public key, said request providing to the server information pertaining to at least the public key and excluding the private key; instructions for receiving from the server, via the authenticated channel, a signature certificate obtained in response to said request; instructions for calculating a cryptographic signature by means of the private key, and then for destroying the private key; and instructions for formatting the calculated signature with the aid of the signature certificate received via the authenticated channel.

9. Computer program product according to claim 8, wherein the instructions for transmitting the signature certificate request and the instructions for calculating the electronic signature and then for destroying the private key are executable in parallel.

10. Computer program product according to claim 8, wherein at least some of said instructions form part of a program written in a mobile code language and downloadable from said server (2) after establishment of the authenticated channel.

11. Computer program product according to claim 8, wherein said instructions further include instructions for verifying the signature certificate received via the authenticated channel.

12. An electronic signature assistance server, comprising means of authenticating a client station to establish an authenticated communication channel with said client station, means for obtaining a signature certificate in response to a request received from the client station via the authenticated channel and for transmitting said certificate to the client station via the authenticated channel, and means for downloading to the client station a program written in a mobile code language, including instructions for controlling, at least partially, the execution of the following operations by the client station: generation of a private key/public key pair at the client station after the establishment of the authenticated channel; transmission to the server, via the authenticated channel, of a request for a signature certificate generated by means of at least the public key, said request providing to the server information pertaining to at least the public key and excluding the private key; reception, via the authenticated channel, of the signature certificate transmitted by the server in response to said request; calculation of a cryptographic signature at the client station by means of the private key, followed by destruction of the private key; and formatting of the calculated signature with the aid of the signature certificate received via the authenticated channel.

13. An assistance server according to claim 12, wherein the signature certificate has a validity period of at most one day.

14. An assistance server according to claim 12, wherein said operations further comprise a verification of the signature certificate received via the authenticated channel.

* * * * *